May 24, 1966  F. F. BLANKENHORN  3,252,510
HEAT EXCHANGER USING BRAZED JOINTS
Filed Aug. 14, 1964
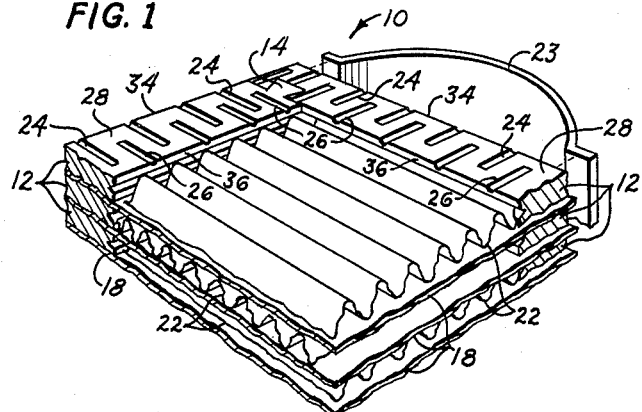
FIG. 1
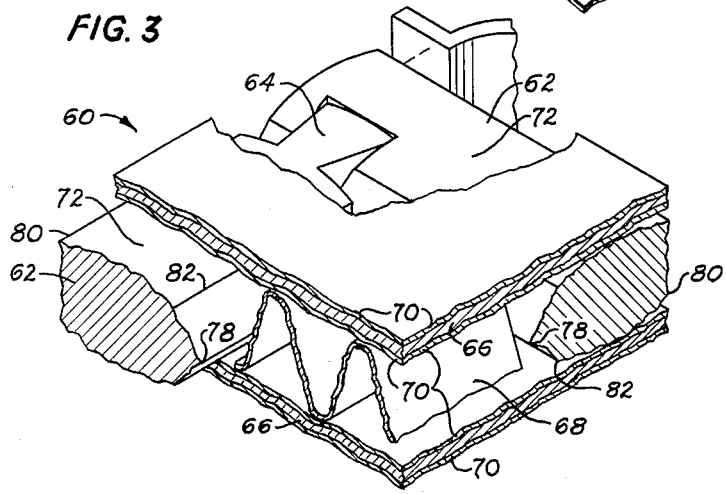
FIG. 3
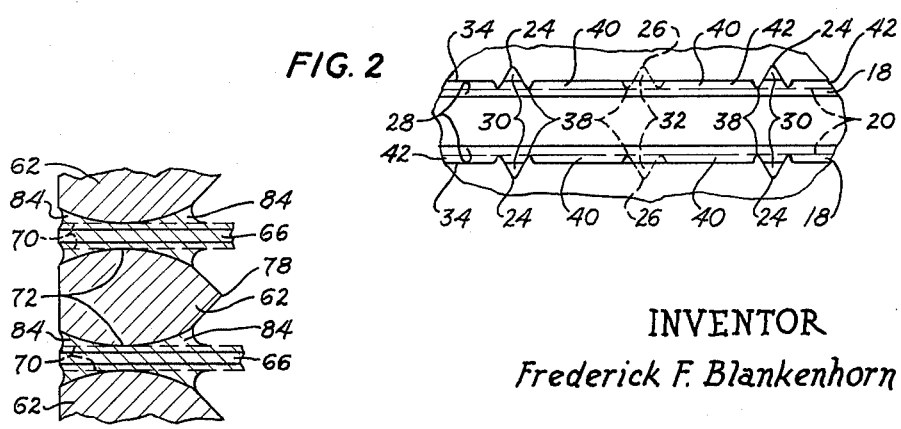
FIG. 2
FIG. 4
INVENTOR
Frederick F. Blankenhorn
By Norton Lesser
Attorney

United States Patent Office 3,252,510
Patented May 24, 1966

3,252,510
HEAT EXCHANGER USING BRAZED JOINTS
Frederick F. Blankenhorn, Indianapolis, Ind., assignor to Stewart-Warner Corporation, Chicago, Ill., a corporation of Virginia
Filed Aug. 14, 1964, Ser. No. 389,556
10 Claims. (Cl. 165—166)

This invention relates to improvements in brazed heat exchangers and more particularly to improvements in brazing the joints forming the heat exchanger.

In application Serial No. 374,884, filed June 5, 1964, and in application Serial No. 65,352, filed October 27, 1960, and now Patent No. 3,140,538, issued July 14, 1964, a heat exchanger utilizing a brazed joint and a method of forming the joint were disclosed in which the joints were in excess of 3/16 to 1/4 of an inch so that headers could be welded to the brazed joint without impairing the joint. The brazed joint and method incorporated a discontinuity formed by grooving the frame members or side bars in order to form raised or upset portions on the surfaces of the side bars. When the side bars were stacked with aluminum plates having a brazing alloy cladding located intermediate the side bars, the raised portions formed channels in which molten flux could flow. Thus the flux could adequately treat the adjacent surfaces and enable the cladding to form a solid extensive joint between the members when they were dip brazed, for example.

In the just described arrangement the grooves or depressions were usually formed to extend from one edge to the other edge of the side bars. While this permits a very satisfactory joint to be formed, for certain types of heat exchanger cores, it is not the most satisfactory arrangement if a long brazing cycle must be employed. On such a long brazing cycle, braze alloy diffusion and surface creeping or other mechanisms may result in small irregular and often porous internal and external edge fillets. With such fillets, the grooves extending from edge to edge of the side bars are not always perfectly sealed with the result that they form passageways in which leakage can occur from the inside edge of the side bars to the outside. Since the heat exchanger side bars may incorporate a large number of such grooves and the location of imperfectly sealed grooves are difficult to ascertain, a considerable problem exists.

The present invention incorporates a rather simple and unique concept for solving the problem created by the aforedescribed situation. This is done basically by terminating the communicating passageways between the opposite edges of the side bars, while still forming the channels for flux flow. Several approaches for forming the side bars to accomplish this result are disclosed herein. The approaches comprise forming alternate grooves from opposite edges of the side bar with each groove terminating before reaching the opposite edge so that no complete single leakage passageway can be formed in the side bar from one edge to the other edge. Another approach is simply to provide the side bars with a crown extending longitudinally along the central axis of the bar. This also effectively terminates leakage communication between opposite edges of the side bars, while permitting flux flow over required surface area.

Accordingly, a primary object of the invention is to provide an improved heat exchanger construction.

Another object of the present invention is to provide leak-proof dip brazing of heat exchanger joints subject to long brazing cycles and of sufficient size to accommodate welded headers without impairing the joints.

Still another object of the present invention is to provide leak-proof dip brazing for joints subject to long heating cycles.

Other objects, advantages and features of the invention will become apparent on examination of the following specification, claims and accompanying drawings in which:

FIG. 1 is a perspective view of a fragmentary portion of a heat exchanger core and illustrating a portion of a welded header connected thereto;

FIG. 2 is a fragmentary showing a pair of brazed side bar members of the type illustrated in FIG. 1;

FIG. 3 is a perspective view of a fragmentary portion of a heat exchanger core employing another side bar configuration for accomplishing the purpose of the present invention; and FIG. 4 is a fragmentary side sectional view of brazed side bar members of the type illustrated in FIG. 3.

Referring to FIG. 1 of the drawings a portion of a heat exchanger core is indicated by the reference character 10. The core 10 comprises side bar or frame members 12 stacked in layers forming rectangularly shaped rings with the corners of the side bars in each layer being connected by dovetail joints 14. Interposed between each layer are aluminum sheets 18 having a brazing alloy cladding on opposite sides thereof as indicated by the broken lines 20 in FIG. 2. Corrugated fin structures 22 are deposited on the sheets 18 in the rectangular opening formed by the side bars 12 of each layer. Suitable openings or interruptions (not shown) are provided in the side bars for ingress and egress of fluid passing through the exchanger from headers such as 23, which are welded directly to the outside surface of the side bars 12. To complete the core construction, a top plate (not shown) is placed above the upper side bar members 12. The thickness of the plates 18 may vary, for example, from .032" to .064" for pressures from 200 p.s.i.g. to 650 p.s.i.g. and the width of the side bars may, for example, be 5/8" and their height between .2 to 3/8" with the length approximately 124".

The side bars 12 and sheets 18 comprise a substantially pure aluminum or aluminum alloy, and the brazing cladding 20 may commonly comprise 6.8% to 8.2% silicon, .25% copper, .80% iron, .2% zinc with the remainder of aluminum. Other cladding alloys may comprise 11% to 13% silicon, .3% copper, .8% iron, .2% zinc, .1% magnesium, .15% manganese with the remainder aluminum, or, for example, may comprise 4% to 3% silicon, .25% to 4.7% copper, .8% iron, and from .1% to 10.5% zinc.

The melting points of the various parent metals such as side bars 12 and sheets 18 range from approximately 1025° to 1015° F. with the melting range of the preferred parent metal being from 1190° to 1210° F. The approximate melting range for the brazing alloy is from 960° to 1165° F. The melting points for the two commonly employed and preferred brazing filler alloys, previously mentioned, range from approximately 1090° to 1135° F. and from 1070° to 1080° F. respectively.

In accordance with the dip process of brazing, the components to be brazed are held together by suitable means and immersed in a bath of molten brazing flux. The composition of the preferred flux is 4% to 6% aluminum fluoride and 12% to 25% lithium chloride with the balance of the flux composed of chlorides of the alkali metals. Approximately 110 pounds of dry flux is required to form a cubic foot of liquid. The functions of the molten flux or salt bath are of course to deoxidize all surfaces to be brazed, while heating the constituent parts to be brazed, and to prevent reoxidation of these parts while submerged in the molten bath.

Upon immersion of the component parts in the hot flux bath, the flux flows over the surfaces to be brazed and cleans and dioxidizes the same. The resultant heating of the parts in the flux bath up to brazing temperature, causes the brazing alloy 20 to melt and flow between the members 12 and 18 being brazed.

As mentioned previously the invention incorporates means such as the discontinuities formed by grooving the side bars disclosed in the aforementioned application and patent to permit flux flow between the surfaces for adequately treating the surfaces of the members to be brazed. This permits the width of aluminum members, such as side bars 12 to be joined by brazing to be substantially increased. Thus the largest sizes of aluminum side bars, which heretofore have been brazable by the dip process, have been limited to 3/16 of an inch to 1/4 of an inch, while as pointed out above the present invention is intended to permit the brazing of side bars of much greater width even up to widths of several inches without leakage. While the described grooving arrangement is very satisfactory under some conditions, leakage may be a problem.

These conditions sometimes occur with the long brazing cycles required for large heat exchanger cores such as described in a bulletin entitled, Industrial Heat Exchanger Equipment, published by Stewart-Warner Corporation, South-Wind Division. Such large cores may be preheated in air from room temperature to 1050° F. in 3 to 6 hours depending on their size and then the core is immersed in a molten flux bath at 1120° F. to 1127° F. from 20 to 40 minutes depending on the core weight. Braze alloy diffusion or surface creepage or possibly other mechanisms during the comparatively long brazing cycle may lead to porous joints and fillets in the grooves or at their ends so that the grooves provide a leakage passageway.

In accordance with one form of the invention, the leakage passageways are avoided by spaced local discontinuities 24 to 26 formed by grooving the side bars 12 along each face 28, with grooves 30 and 32 respectively extending from opposite edges 34 and 36 and terminating intermediate the two edges and preferably about 3/16" from the opposite edge. The discontinuities 24 and 26 are formed by any suitable means as by striking or pressing the metal to form grooves 30 and 32 below the normal contour of the surface, and as exaggerated in FIG. 2 to cause thereby the slight amount of material or ridges 38 to be raised above the normal surfaces. The depth of these grooves for use on the heat exchanger core side bars 12 is of the order of .005 of an inch. The equal center line spacing of these grooves 30 and 32 is of the order of 3/16 of an inch. Although the opposite interfaces of the bars 12 are flat and parallel, matching the flat interfaces of the bars 12 with the plates 18 causes the discontinuities to define a plurality of channels or valley spaces 40 between the adjacent discontinuities.

The function of these discontinuities is to provide channels 40 for the flow or flux to all parts of the surfaces to be brazed to assure a good brazed joint throughout. The spacing and/or depth of the grooves 30 and 32 and channels 40 may vary according to the width of the members to be brazed as long as the grooves and channels permit flux flow throughout the entire area of the interfaces while the parts to be brazed are stacked solid on the ridges 38 as indicated by the dotted lines 20 in FIG. 2. It is also pointed out that the depth of the grooves and channels must not be so great that cladding or other forms of brazing alloy cannot entirely fill the same during the brazing process. Stating it another way, the amount of brazing alloy, in whatever form it is used, must be sufficient to entirely fill the grooves and channels 40 to form a brazing filler throughout the entire extent of the interfaces being brazed as indicated at 42 in FIG. 2. Since this ensures a solid brazed joint of sufficient size to permit the header 23 to be subsequently welded to the side bars 12 without impairing the joints.

In FIGS. 3 and 4 an alternate arrangement for securing the results achieved by the arrangement in FIGS. 1 and 2 is illustrated. Thus, in FIG. 3 a portion of a heat exchanger core 60 is illustrated. The core 60 comprises side bars 62 arranged in stacked layers of rectangular rings connected at the corners by dovetail joints 64 with separator plates 66 interposed between each layer of side bars and corrugated fin structure 68 deposited on the plates in the opening formed by each layer of side bars 62.

The plates 66 are provided with a brazing alloy cladding along opposite surfaces as indicated at 70. The side bars 62 instead of having flat upper and lower surfaces are provided with convex surfaces or crowns at 72 formed in opposite directions along the longitudinal axis of the side bars. The height of the crowns above the adjacent edges of the side bars may vary from .002 to .005 of an inch while the total height of the bar, for example, may vary between .2" and .375" and its total width to a horizontal crown 78 adjacent the fins 68 being 5/8". The distance between the outer edge 80 of each side bar 62 and the opposite inner edge 82 may, for example, be 17/32".

There is thus provided a clearance space or channel indicated at 84 in FIG. 4, between the cladding 70 and the adjacent side bars 62 when the core is stacked for dip brazing. The clearance space extends longitudinally along the opposite edges of the bars so as to permit flux flow along the surfaces to be treated when the core is dipped in the molten flux bath, while the crowns 72 prevent the establishment of a leakage path between the opposite edges of the side bars.

The foregoing constitutes a description of an improved arangement for dip brazing heat exchanger cores of the type adapted to have headers welded thereto without joint impairment and whose inventive concepts are believed set forth in the accompanying claims.

What is claimed is:

1. A heat exchanger core having a header welded thereto for passing fluids through said core to place said fluids in heat exchange relationship with each other, comprising in combination with said welded header a plurality of thin separator plates defining fluid passageways in communication with respective welded headers, a plurality of stacked bar members of thicker section than said plates and having surfaces of indeterminate width greater than 1/4 inch, a plurality of spaced apart elongated discontinuities in at least one surface of each bar member with the cross-section of each discontinuity being substantially smaller than the spacing therebetween and with each discontinuity projecting both above and below the normal contour of the respective surface a few thousandths of an inch, adjacent ones of said discontinuities extending from opposite edges of each side bar and terminating prior to the respective other edge whereby the portion of each discontinuity projecting below said normal contour is prevented from completing a leakage path from the respective opposite edge to the other edge and a brazing alloy cladding for opposing separator plate surfaces, one separator plate being stacked between adjacent bar members with said cladding therebetween whereby the projecting portions of the discontinuities above said normal contour on one surface of each bar member contacting the cladding of the respective separator plate surface define channels for enabling the introduction of a molten flux to each bar member surface and for causing said brazing alloy to form a solid brazed joint between the bar members and said separator plates whereby welding heat generated in response to the subsequent welding of said headers to said heat exchanger core is dissipated without any substantial destruction of the brazed joint.

2. The core claimed in claim 1 in which each discontinuity terminates at least 3/16 of an inch from the respective other edge.

3. A heat exchanger core having headers welded thereto for passing fluids through said core to place said fluids in heat exchange relationship with each other, comprising in combination with said welded headers, a plurality of thin separator plates defining fluid passageways in communication with respective welded headers, each plate having a brazing alloy surface cladding on opposite sides thereof, a plurality of stacked bar members of considerably greater cross-sectional thickness than said plates with each bar member having opposing surfaces greater than ¼ in width, one of said separator plates stacked between each pair of bar members with said cladding located adjacent a respective one of said opposing surfaces, and means on each opposing surface forming a channel between respective opposing surface of each side bar and the adjacent plate with each channel being initiated at a respective edge of said opposing surface and terminating at a position spaced from the other edge whereby the completion of a continuous leakage path between opposite edges of said opposing surface is prevented, while the introduction of a molten flux between each opposing surface and the adjacent cladding forms a solid brazed joint in each channel between the bar members and the separator plates and welding heat generated in response to the subsequent welding of said headers to said heat exchanger core is dissipated without any substantial destruction of the brazed joint in said channels.

4. The arrangement claimed in claim 3 in which said means comprises a crowned surface extending longitudinally along the horizontal surface of the respective side bar with the highest point on the crown lying between the opposite edges of said horizontal surface.

5. A heat exchanger of the type formed by dip brazing side bars to separator plates located intermediate said side bars with said separator plates having a brazing alloy cladding thereon and wherein said side bars and separator plates are heated in air to a temperature of approximately 1050° F. for 3 to 6 hours and then dip brazed by immersion in a flux bath at approximately 1120° to 1127° F. for 20 to 40 minutes, the improvement comprising a discontinuity formed in opposite side bar surfaces with each discontinuity being substantially smaller in cross-section than the spacing therebetween and extending respectively above and below the normal contour of the bar member surface for a few thousandths of an inch to permit said flux to flow between said side bars and said separator plates, respective ones of said discontinuities extending from respective edges of said opposite side bar surfaces and terminating at a position spaced from the other edge whereby the portion of each discontinuity below said surface is prevented from completing a leakage path between said edges for fluids in said heat exchanger in the event said brazing is imperfectly formed in said portions.

6. A heat exchanger of the type adapted to be formed by brazing in a molten flux bath stacked side bars to separator plates located intermediate said side bars with said separator plates having a brazing alloy cladding thereon, the improvement comprising a depressed portion formed in opposite side bar surfaces with each depressed portion enabling the formation of a path for flux to flow between said side bars and said separator plates, each depressed portion extending from a respective edge of said side bars and terminating at a position spaced from the other edge whereby said depressed portions are prevented from completing a leakage path between said edges for fluids in said heat exchanger in the event said brazing is imperfectly formed in said depressed portions.

7. The heat exchanger claimed in claim 6 in which said depressed portions extend longitudinally along a respective edge and are convex in shape.

8. A heat exchanger of the type having separator plates located intermediate stacked side bars and brazed thereto by a brazing alloy on said plates engaging opposite side bar surfaces for forming a joint between said plates and bars on immersion of said bars, plates and alloy in a molten flux bath, the improvement comprising a projection on each of said opposite side bar surfaces defining a path for said flux to flow between each said side bar surface and the respective plate on immersion of said bars, plates and alloy in said bath, and a groove formed in each of said opposite side bar surfaces for creating a respective projection with each groove extending from a respective side bar edge and terminating at a position spaced from the opposite edge whereby each groove is prevented from completing a leakage path between said one and opposite edges for fluids in said heat exchanger in the event the brazing in said groove is imperfectly formed.

9. A side bar for use in a heat exchanger of the type including separator plates spaced by said bar to define a fluid passageway and brazed to opposite surfaces of said side bar by a brazing alloy between each said surface and a respective plate on immersion of said bar, plates and alloy in a molten flux, the improvement comprising a ridge on each of said opposite surfaces to facilitate flux flow between the respective surface and plate for brazing said bar and plates on immersion of said bar, plates and alloy in said flux, and a depression in each said surface for creating a respective ridge with each depression extending from one edge of the respective surface and terminating a predetermined distance from the opposite edge to prevent the subsequent passage of a fluid from said passageway and between said one and opposite edges in the event the brazing in said depression is imperfectly formed.

10. A side bar for use in a heat exchanger of the type including separator plates spaced by said bar to define a fluid passageway and brazed to opposite surfaces of said side bar by a brazing alloy between each said surface and a respective plate on immersion of said plates, bar and alloy in a molten flux, the improvement comprising a longitudinally extending crown formed on each of said opposite surfaces with the longitudinal axis of said crown lying between opposite edges of the respective surface for spacing the edges of the respective surfaces from the adjacent plate to facilitate flux flow between said surfaces and the adjacent plate for brazing said plates and bar and preventing the subsequent passage of a fluid from said passageway and between said one and opposite edges in the event the brazing is imperfectly formed.

References Cited by the Examiner

UNITED STATES PATENTS

| | | | |
|---|---|---|---|
| 2,995,344 | 8/1961 | Hryniszak | 165—166 |
| 3,140,538 | 7/1964 | Rutledge | 29—482 |
| 3,151,675 | 10/1964 | Lysholm | 165—166 |

ROBERT A. O'LEARY, *Primary Examiner.*

M. A. ANTONAKAS, *Assistant Examiner.*